US012320892B2

(12) United States Patent
Fujiwara et al.

(10) Patent No.: US 12,320,892 B2
(45) Date of Patent: Jun. 3, 2025

(54) OBJECT DETECTION DEVICE, OBJECT DETECTION METHOD AND PROGRAM

(71) Applicant: DENSO CORPORATION, Kariya (JP)

(72) Inventors: Naohiro Fujiwara, Kariya (JP); Makoto Ohkado, Kariya (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 17/231,257

(22) Filed: Apr. 15, 2021

(65) Prior Publication Data

US 2021/0231799 A1 Jul. 29, 2021

Related U.S. Application Data

(63) Continuation of application No. PCT/JP2019/032222, filed on Aug. 19, 2019.

(30) Foreign Application Priority Data

Oct. 19, 2018 (JP) .................................. 2018-197328

(51) Int. Cl.
| | |
|---|---|
| *G01S 15/42* | (2006.01) |
| *G01S 7/539* | (2006.01) |
| *G01S 15/931* | (2020.01) |
| *G01S 15/86* | (2020.01) |
| *G08G 1/16* | (2006.01) |

(52) U.S. Cl.
CPC .............. *G01S 15/42* (2013.01); *G01S 7/539* (2013.01); *G01S 15/931* (2013.01); *G01S 15/86* (2020.01); *G01S 2015/937* (2013.01); *G08G 1/16* (2013.01)

(58) Field of Classification Search
None
See application file for complete search history.

(56) References Cited

U.S. PATENT DOCUMENTS

| 8,108,147 B1 * | 1/2012 | Blackburn ............. G08G 1/166 |
|---|---|---|
| | | 382/104 |
| 10,885,354 B2 * | 1/2021 | Maeda .................... G01S 15/87 |
| 2002/0075180 A1 * | 6/2002 | Sakai ....................... G01S 17/86 |
| | | 342/52 |

(Continued)

FOREIGN PATENT DOCUMENTS

| JP | 2000-123298 A | 4/2000 |
|---|---|---|
| JP | 5843948 B1 * | 1/2016 |

(Continued)

OTHER PUBLICATIONS

Gangawane, Obstacle Detection And Object Size Measurement For Autonomous Mobile Robot Using Sensor, IRJET, vol. 3, Issue 5 (Year: 2016).*

*Primary Examiner* — Isam A Alsomiri
*Assistant Examiner* — Vikas Atmakuri
(74) *Attorney, Agent, or Firm* — Maschoff Brennan

(57) ABSTRACT

An object detection device includes an azimuth sensor that measures an azimuth region of an object that is present around a vehicle, a plurality of distance sensors each of which measures a distance to the object, and an object determination section that calculates arcs of circles whose radii are the distances measured by the respective distance sensors and calculates intersection points of a tangent to adjacent ones of the arcs and the azimuth region measured by the azimuth sensor.

5 Claims, 6 Drawing Sheets

(56) References Cited

U.S. PATENT DOCUMENTS

| | | | |
|---|---|---|---|
| 2003/0114964 A1* | 6/2003 | Strumolo | G08G 1/165 |
| | | | 701/1 |
| 2010/0235129 A1* | 9/2010 | Sharma | G01S 17/86 |
| | | | 702/97 |
| 2011/0242305 A1* | 10/2011 | Peterson | G01S 15/876 |
| | | | 367/87 |
| 2017/0308262 A1* | 10/2017 | Murase | G08G 1/166 |
| 2018/0074170 A1* | 3/2018 | Ray | G01S 7/021 |
| 2018/0178811 A1* | 6/2018 | Ohta | G08G 1/167 |
| 2019/0346557 A1 | 11/2019 | Baba | |
| 2020/0057897 A1* | 2/2020 | Matsuura | G01S 15/08 |
| 2020/0284905 A1* | 9/2020 | Kim | G01C 3/04 |

FOREIGN PATENT DOCUMENTS

| | | | |
|---|---|---|---|
| JP | 2019053005 A | * | 4/2019 |
| WO | WO-2020012852 A1 | * | 1/2020 |

* cited by examiner

OBJECT DETECTION DEVICE, OBJECT DETECTION METHOD AND PROGRAM

CROSS-REFERENCE TO RELATED APPLICATION

This application is based on and claims the benefit of priority from earlier Japanese Patent Application No. 2018-197328 filed Oct. 19, 2018, the description of which is incorporated herein by reference.

BACKGROUND

Technical Field

The present disclosure relates to an object detection device, an object detection method, and a program for detecting an object that is present around a vehicle.

RELATED ART

Techniques for detecting an object that is present around a vehicle have been researched and developed for vehicle driving assistance, autonomous driving control, or the like.

SUMMARY

As an aspect of the present disclosure, an object detection device is provided which includes: an azimuth sensor that measures an azimuth region of an object that is present around a vehicle; a plurality of distance sensors each of which measures a distance to the object; and an object determination section that calculates arcs of circles whose radii are the distances measured by the respective distance sensors and calculates intersection points of a tangent to adjacent ones of the arcs and the azimuth region measured by the azimuth sensor.

DETAILED DESCRIPTION OF THE PREFERRED EMBODIMENTS

Techniques for detecting an object that is present around a vehicle have been researched and developed for vehicle driving assistance, autonomous driving control, or the like. JP 2000-123298 A discloses an obstacle position detection device that measures not only a distance to an obstacle in front of a vehicle but also a lateral position of the obstacle to ensure safe driving of the vehicle. For the purpose of detecting also a lateral dimension of an obstacle, the invention of JP 2000-123298 A first calculates lateral positions of two obstacles on the basis of an image signal and distance information, and then measures two-dimensional positions of the two obstacles on the basis of the obtained lateral position information and the distance information.

JP 2018-81628 A discloses a technique in which a position of an object that is present in front of a vehicle and a distance to the object are calculated by using an electromagnetic wave sensor and an image sensor, and when information detected by the electromagnetic wave sensor matches information detected by the image sensor, a distance detected by the electromagnetic wave sensor and an azimuth detected by the image sensor are used to determine a position of the object, and when the information detected by the electromagnetic wave sensor greatly differs from the information detected by the image sensor, only the information acquired by the image sensor is used to calculate a position of the object that is present in front of the vehicle and a distance to the object.

An object of the present disclosure is to provide a method of accurately and simply detecting an object on the basis of information acquired from a distance sensor and an azimuth sensor.

The embodiment described below shows an example of implementation of the present disclosure, and does not limit the present disclosure to the specific configuration described below. The present disclosure may be implemented by appropriately using a specific configuration according to the embodiment.

Figure 1:
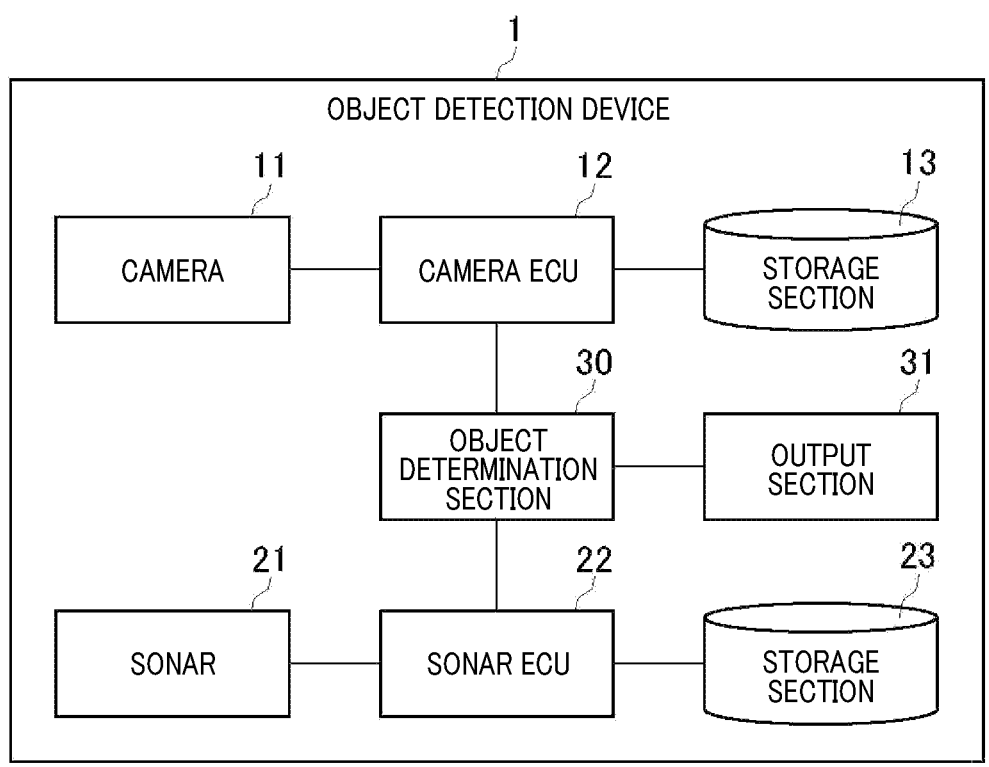
FIG. 1 is a diagram showing a configuration of an object detection device according to an embodiment.

FIG. 1 is a diagram showing a configuration of an object detection device 1. The object detection device 1 is mounted on a vehicle for use, and has a function of detecting an object that is present around the vehicle. The object detection device 1 includes a camera 11, a sonar 21, an object determination section 30 that includes an electronic control unit (ECU) and a storage medium, and an output section 31.

The camera 11 captures an image of the surroundings of the vehicle. The camera 11 is connected to a camera ECU 12. The camera ECU 12 performs image processing of an image captured by the camera 11 to detect an object from the image, and obtains azimuth data on an azimuth of the object. The camera ECU 12 has a function of an image processing section, and image processing performed by the camera ECU 12 allows the camera 11 to function as an azimuth sensor. The azimuth data obtained by the camera ECU 12 is temporarily stored in a storage section 13 connected to the camera ECU 12.

The sonar 21 is a device that emits ultrasonic waves and measures the time required for a reflected wave of the ultrasonic waves to be returned from the object. The sonar 21 is connected to a sonar ECU 22. The sonar ECU 22 obtains distance data on a distance to the object on the basis of the detection result obtained by the sonar 21. Processing performed by the sonar ECU 22 allows the sonar 21 to function as a distance sensor. The distance data obtained by the sonar ECU 22 is temporarily stored in a storage section 23 connected to the sonar ECU 22.

The object determination section 30 acquires, from the camera ECU 12, the azimuth data on the azimuth of the object, and acquires, from the sonar ECU 22, the distance data on the distance to the object. The object determination section 30 detects a position and width of the object on the basis of the azimuth data and the distance data.

Figure 2:
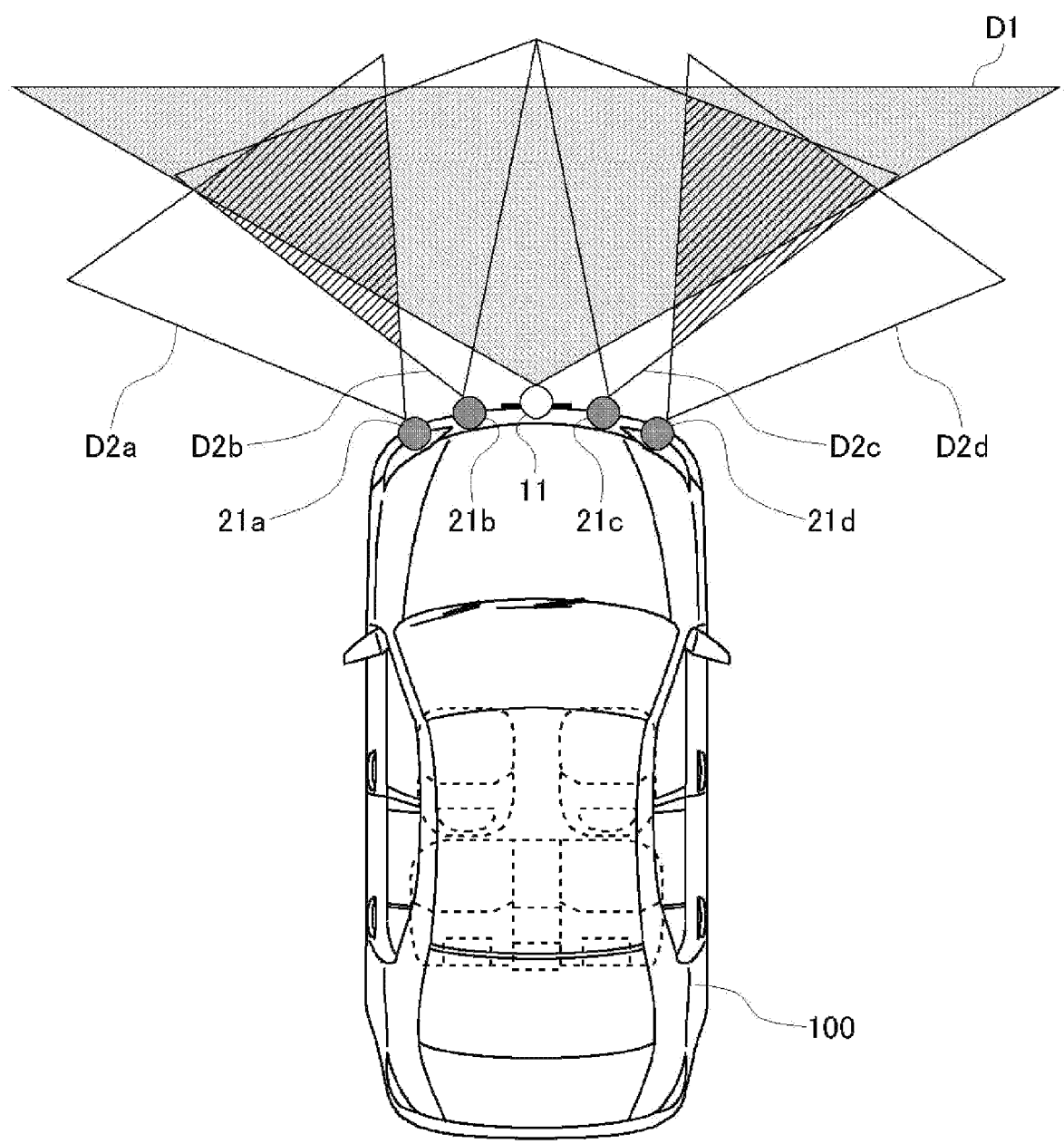
FIG. 2 is a diagram showing an example of arrangement of a camera and sonars mounted on a vehicle.

FIG. 2 is a diagram showing an example of arrangement of the camera 11 and the sonar 21 mounted on a vehicle 100.

The object detection device 1 of the present embodiment includes the camera 11 and a plurality of the sonars 21 on the front surface of the vehicle 100. The sonars 21a and 21b and sonars 21c and 21d are arranged with the camera 11 being interposed therebetween. The "sonar 21" refers to one of the sonars 21a to 21d that is not explicitly specified.

The object determination section 30 detects a position of an object that is present in a region in which an imaging angle D1 of the camera 11 overlaps with detection ranges of the sonars 21a, 21b, 21c, and 21d. The sonars 21a, 21b, 21c, and 21d respectively have detection ranges D2a, D2b, D2c, and D2d that are different from each other and overlap to a certain degree. The sonars 21a and 21b are arranged adjacent to each other with a space of approximately ¼ to ⅛ of the vehicle width therebetween. The same applies to the sonars 21c and 21d. This arrangement enables accurate object detection.

Figure 3:
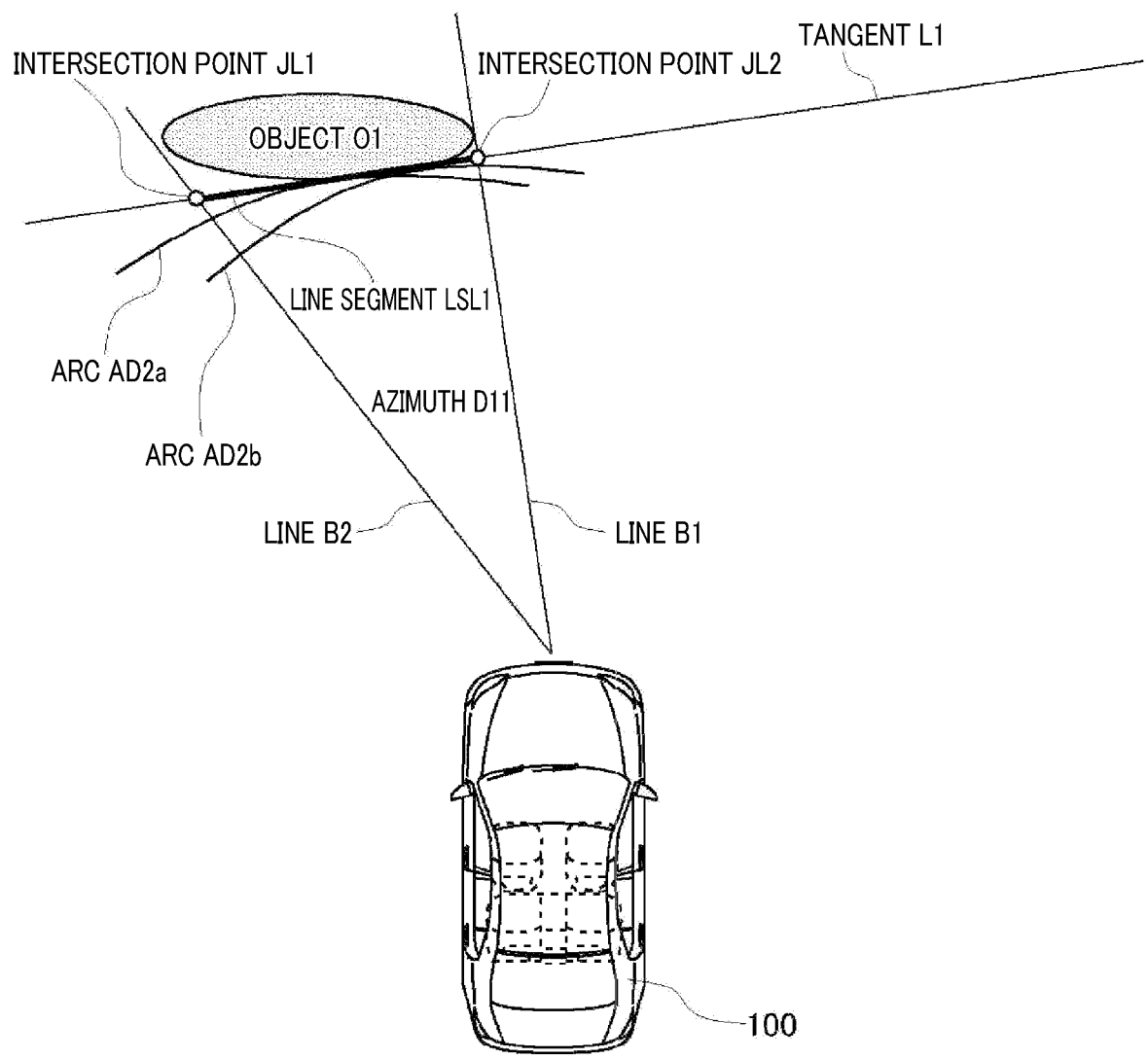
FIG. 3 is a diagram showing a method of measuring an object position when the same object is recognized by the camera and a plurality of sonars.

FIG. 3 is a diagram showing a method of measuring an object position when the same object is recognized by the camera 11 and adjacent ones of the sonars 21. An azimuth region D11 is a region in which an object is present when viewed from the camera 11 and that is surrounded by a line B1 and a line B2 that extend from the vehicle 100 toward both end portions of an object O1. An arc AD2a in the vicinity of the object is an arc of a circle whose center point is a mounting position of the sonar 21a and whose radius is a distance to the object O1 detected by the sonar 21a. An arc AD2b in the vicinity of the object is an arc of a circle whose center point is a mounting position of the sonar 21b and whose radius is a distance to the object O1 detected by the sonar 21b. The arcs AD2a and AD2b based on the distances respectively detected by the sonars 21a and 21b adjacent to each other overlap with each other in the vicinity of the object O1. First, the object determination section 30 calculates (draws) a tangent L1 common to the above arcs. Next, the object determination section 30 obtains an intersection point JL1 of the tangent L1 and the line B2, and an intersection point JL2 of the tangent L1 and the line B1. The lines B1 and B2 are boundaries of the azimuth region D11 detected by the camera 11. Then, the object determination section 30 calculates (draws) a line segment LSL1 whose end points are the intersection points JL1 and JL2. The line segment LSL1 makes it possible to accurately represent the position and width of the object in front of the vehicle.

Figure 4:
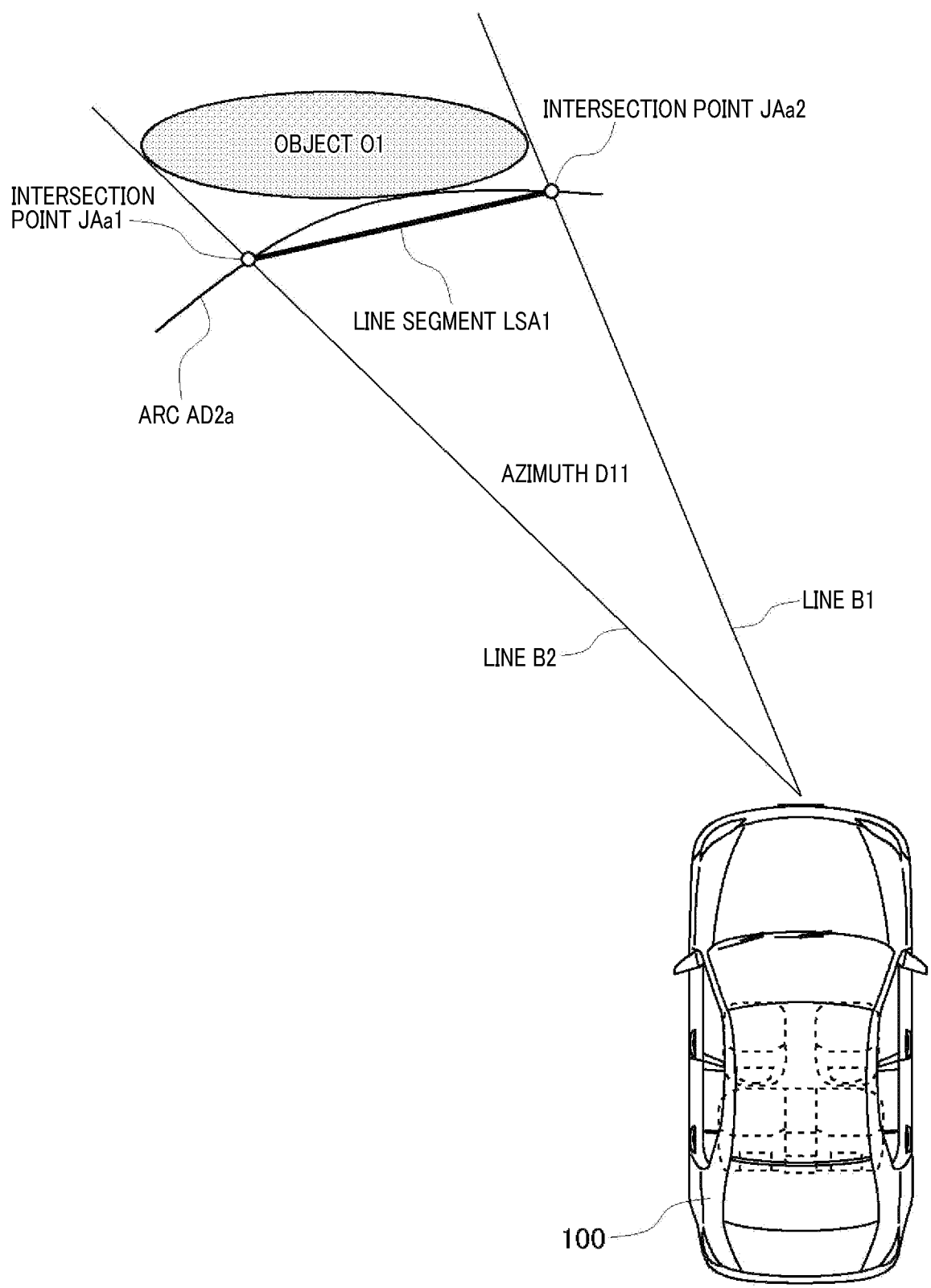
FIG. 4 is a diagram showing a process performed when the camera detects an azimuth of the object and only one of the sonars detects a distance to the object.

FIG. 4 is a diagram showing a process performed when the camera 11 detects an azimuth of the object and only one of the sonars 21 adjacent to each other detects a distance to the object. When the object O1 is distant from the front of the vehicle 100, in some cases, only the single sonar 21a detects a distance to the object. Since there is only one arc of a circle whose radius is the distance detected by the sonar 21, no tangent to two arcs can be calculated (drawn), unlike in the example shown in FIG. 3. In this case, the object determination section 30 obtains both an intersection point JAa1 of the arc AD2a and the line B2 and an intersection point JAa2 of the arc AD2a and the line B1. The lines B1 and B2 are boundaries of the azimuth region D11 detected by the camera 11. Then, the object determination section 30 calculates (draws) a line segment LSA1 between the intersection points. This makes it possible to detect the position and width of the object 25 with practically sufficient accuracy even when distance data is obtained by only one of the sonars 21.

Figure 5:
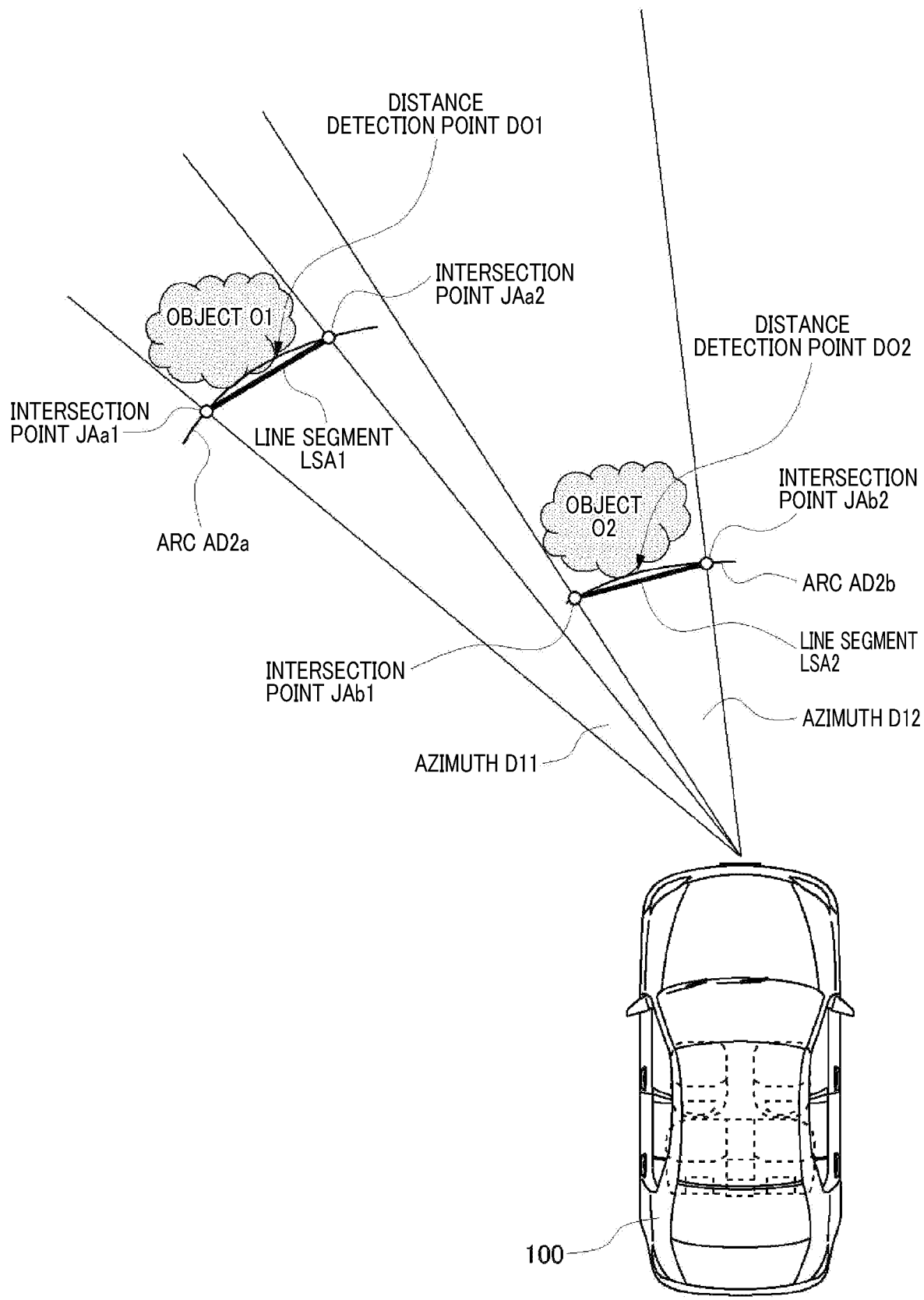
FIG. 5 is diagram showing a process performed when the camera detects azimuths of a plurality of objects and a plurality of sonars detect distances to the respective objects.

FIG. 5 is diagram showing a process performed when the camera 11 detects azimuths of a plurality of objects and adjacent ones of the plurality of sonars 21 detect distances to the respective objects. When an object to be detected has a complicated shape, the sonar 21 detects a distance to a portion of the object directly opposite to the sonar 21. Thus, although a distance to the object is detected, a portion of the object by which ultrasonic waves are reflected and the distance to which is detected depends on a shape of the object and an angle of the sonar 21 relative to the object. Furthermore, in some cases, the distances detected by the adjacent ones of the sonars 21 are distances to different objects. Accordingly, in some cases, the distances detected by the adjacent ones of the sonars 21 are greatly different from each other, and arcs for the distances are not in contact with each other and no tangent to the arcs can be calculated (drawn). Thus, in such a case, assuming that a plurality of objects are detected, positions and widths of the respective objects are estimated.

In FIG. 5, two objects O1 and O2 are present in front of the vehicle, and the sonars 21a and 21b adjacent to each other detect distances to the objects, but it is impossible to calculate (draw) a tangent to the arc AD2a calculated (drawn) for a distance DO1 detected by the sonar 21a and the arc AD2b calculated (drawn) for a distance DO2 detected by the sonar 21b. In such a case, in consideration with the detection ranges of the sonars 21 and the azimuth regions of the objects detected by the camera (D11 for O1, D12 for O2), with regard to distance information for which no tangent can be calculated (drawn), the object determination section 30 determines that different objects are detected, and calculates (draws) a line segment (LSA1 for O1) connecting both intersection points (JAa1 and JAa2 for O1) of the arc (AD2a for O1) and boundaries of the azimuth region D11 detected by the camera 11, and a line segment (LSA2 for O2) connecting both intersection points (JAb1 and JAb2 for O2) of the arc (AD2b for O2) and boundaries of the azimuth region D12 detected by the camera 11. Then, the object determination section 30 determines the line segments as positions and widths of the objects. Thus, object detection can be performed even when the distances detected by the adjacent ones of the sonars 21 do not match and no tangent for the distances can be calculated (drawn).

Figure 6:
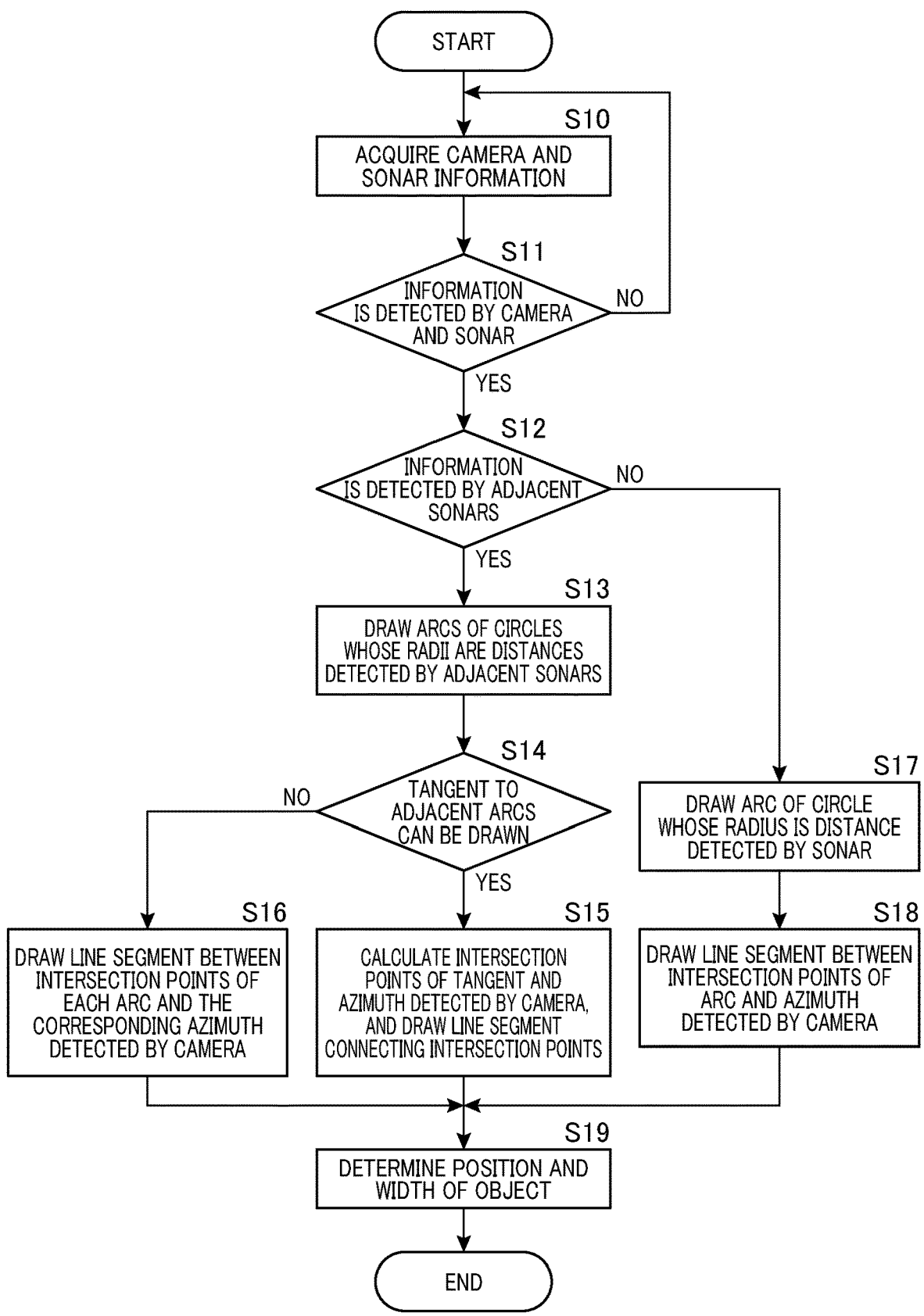
FIG. 6 is a diagram showing operation of the object detection device.

FIG. 6 is a flow diagram showing operation of the object detection device 1. At step S10, the object detection device 1 detects an object from an image captured by the camera 11, acquires azimuth data on the object, and stores the acquired data in the storage section 13 of the ECU 12. Furthermore, on the basis of data detected by the sonar 21, the object detection device 1 acquires distance data on a distance to a position at which the object is present. The object detection device 1 stores the acquired data in the storage section 23 of the sonar ECU 22.

When the determination result at step S11 is NO, that is, when no information is detected by either the camera 11 or the sonar 21, the object detection device 1 repeats at predetermined intervals the process of acquiring information by using the camera 11 and the sonar 21. When the determination result at step S11 is YES, that is, when information is detected by the camera 11 and the sonar 21, at step S12, the object determination section 30 determines whether the information is detected by adjacent ones of the sonars 21. When the determination result at step S12 is YES, that is, when distances are detected by adjacent ones of the sonars 21, at step S13, the object determination section 30 determines an azimuth region detected by the camera 11, and calculates (draws) arcs of circles whose radii are the distances detected by the sonars 21.

Next, at step S14, the object determination section 30 determines whether a tangent to both the arcs can be calculated (drawn). When the determination result at step S14 is YES, that is, when the tangent is calculated (drawn), the object determination section 30 determines that the adjacent ones of the sonars 21 that have detected the distances have measured the distance to the same object, and at step S15, the object determination section 30 calculates intersection points of the tangent and the azimuth region detected by the camera 11, and calculates (draws) a line segment connecting the intersection points. Thus, at step S19, the object determination section determines a position and width of the identified target. The line segment generated from the azimuth detected by the camera 11 and the distance detected by the adjacent ones of the sonars 21 represents the position and width of the object with high accuracy.

When the determination result at step S12 is NO, that is, when a distance is detected by only one of the sonars 21 and no distance is detected by another one of the sonars 21 adjacent to the one of the sonars 21, at step S17, the object determination section 30 calculates (draws) an arc of a circle whose radius is the distance detected by the one of the sonars 21. In this case, no tangent can be calculated (drawn); thus, at step S18, the object determination section 30 calculates intersection points of the arc and the azimuth region detected by the camera 11, and calculates (draws) a line segment between both the intersection points. At step S19, the object determination section 30 determines a position and width of the object on the basis of the line segment. This line segment is obtained without using the distance detected by adjacent ones of the sonars 21, causing slightly lower accuracy, but represents the position and width of the object.

In some cases, the determination result at step S14 is NO, that is, the distance information is detected by adjacent ones of the sonars 21 but no tangent can be calculated (drawn) for the distances detected by the respective sonars 21. In such a case, at step S16, for the arcs to which no tangent can be calculated (drawn), the object determination section 30 calculates intersection points of each of the arcs and the corresponding one of the azimuth regions detected by the camera 11, and calculates (draws) a line segment between both the intersection points for each of the arcs. At step S19, the object determination section 30 determines positions and widths of the objects on the basis of the line segments. The line segments calculated (drawn) in this manner represent the positions and widths of the plurality of objects with slightly lower accuracy.

Thus, by combining the distance information obtained by adjacent ones of the sonars 21 with the azimuth information obtained by the camera 11, the object detection device 1 can detect the position and width of the object in front of the vehicle with practically sufficient accuracy when only one of the sonars 21 detects a distance, when adjacent ones of the sonars 21 detect different distances, as well as when adjacent ones of the sonars 21 detect similar distances and a tangent for the distances is calculated (drawn).

The data represented in this manner is outputted, for example, to an autonomous driving control section or the like, allowing the autonomous driving control section to perform autonomous driving control on the basis of the detected information on the position and width of the object. For example, the autonomous driving control section can select a travel route to avoid the object, or stop the vehicle. Furthermore, in the case where the vehicle is driven by a human, when the object detection device 1 recognizes an object that prevents the vehicle from passing through if the vehicle continuously travels on the path on which the vehicle is currently traveling, the object detection device 1 can issue a warning at an early timing.

The functions of the object determination section 30 that implements the operation of the object detection device 1 described above are implemented by the electronic control unit (ECU) (computer) executing a program stored in the storage medium (non-transitory tangible storage medium). That is, the computer readable storage medium stores the program causing the ECU to perform the functions of the object determination section 30 that implements the operation of the object detection device 1 described above. Such a program is also included in the scope of the present disclosure.

The object detection device 1 of the present embodiment represents, in the form of a line segment, an azimuth of an object obtained by the camera 11 and a distance to the object obtained by the sonar 21, whereby the combination of the advantages of the camera 11 and the sonar 21 enables the object detection device 1 to simply and accurately detect the position and width of the object.

Furthermore, since the object detection device 1 includes the plurality of sonars 21 having different detection ranges, when distances are detected by adjacent ones of the sonars 21, obtaining intersection points of a common tangent for the distances and the object azimuth region detected by the camera 11 can calculate accurate position and width of the object, and also when distances to different objects are detected, obtaining intersection points with different object azimuth regions detected by the camera 11 can estimate positions and widths of the respective objects. In particular, since the search ranges of the plurality of sonars 21 cover an object in front of the vehicle with which the vehicle may collide, accurate information is generated.

The object detection device and the object detection method of the present disclosure have been described in detail with reference to the embodiment, but the present disclosure is not limited to the embodiment described above.

In the above embodiment, the object detection device 1 includes the four sonars 21. By increasing the number of sonars 21, positions and widths of a larger number of objects are accurately estimated. Furthermore, the increase in the number of sonars 21 enables a larger number of objects to be simultaneously processed.

In the above embodiment, the sonar 21 is presented as an example of the distance sensor, but the distance sensor is not limited to the sonar, and may be, for example, a millimeter wave radar or a Lidar sensor. Furthermore, the azimuth sensor is not limited to the camera, and may be, for example, a Lidar sensor.

An object detection device (1) of the present disclosure includes an azimuth sensor (11) that measures an azimuth region of an object that is present around a vehicle, a plurality of distance sensors (21) each of which measures a distance to the object, and an object determination section (30) that calculates (draws) arcs of circles whose radii are the distances measured by the respective distance sensors (21) and calculates intersection points of a tangent to adjacent ones of the arcs and the azimuth region measured by the azimuth sensor (11). This makes it possible to determine a position at which the object is present. The azimuth region refers to a region that is determined by the azimuth sensor as a region occupied by the object.

In the object detection device, the object determination section determines a line segment connecting the intersection points as a width of the object. This makes it possible to accurately measure the position and width of the object.

In the object detection device, when only one of the plurality of distance sensors detects a distance, the object determination section calculates intersection points of an arc of a circle whose radius is the distance measured by the one of the plurality of distance sensors and the azimuth region detected by the azimuth sensor. This makes it possible to estimate the position of the object with a certain accuracy even when only one of the sensors detects a distance.

In the object detection device, when there is no tangent to adjacent ones of the arcs to be calculated (drawn), the object determination section calculates intersection points of the arcs of circles whose radii are the distances measured by the respective distance sensors and the azimuth region detected by the azimuth sensor. This makes it possible to estimate the position of the object with a certain accuracy even when no tangent can be calculated (drawn).

An object detection method of the present disclosure includes the steps of: acquiring, from an azimuth sensor provided to a vehicle, azimuth data on an object that is present around the vehicle; acquiring, from distance sensors that are provided to the vehicle and are adjacent to each other, data on a distance to the object; and calculating (drawing), for distances detected by the respective distance sensors, arcs of circles whose radii are the distances measured by the respective distance sensors, calculating (drawing) a tangent to the arcs, and calculating intersection points of the tangent and an azimuth region measured by the azimuth sensor.

An object detection program of the present disclosure is a program for detecting an object that is present around a vehicle. The program causes an ECU to perform the steps of: acquiring, from an azimuth sensor provided to the vehicle, azimuth data on an object that is present around the vehicle; acquiring, from distance sensors that are provided to the vehicle and are adjacent to each other, data on a distance to the object; and calculating (drawing), for distances detected by the respective distance sensors, arcs of circles whose radii are the distances measured by the respective distance sensors, calculating (drawing) a tangent to the arcs, and calculating intersection points of the tangent and an azimuth region measured by the azimuth sensor.

An object detection device of the present disclosure may include an azimuth sensor that measures an azimuth region of an object that is present around a vehicle, a plurality of distance sensors each of which measures a distance to the object, and an object determination section that, when at least one of the plurality of distance sensors detects a distance, calculates intersection points of an arc of a circle whose radius is the distance measured by the at least one of the plurality of distance sensors and the azimuth region detected by the azimuth sensor. This makes it possible to estimate the position of the object with a certain accuracy when at least one of the distance sensors detects a distance.

In the object detection device, the object determination section determines a line segment connecting the intersection points as a width of the object. This makes it possible to estimate the position and width of the object with practically sufficient accuracy.

What is claimed is:

1. An object detection device comprising:
    an azimuth sensor that measures an azimuth region of an object, the object having a first end and a second end opposite to the first end, the object being present around a vehicle, the azimuth region being defined between a first line and a second line, the first line extending from the vehicle toward the first end, the second line extending from the vehicle toward the second end;
    at least first and second distance sensors, the first distance sensor being configured to measure a first distance therefrom to the object, the second distance sensor being configured to measure a second distance therefrom to the object; and
    an object determination section that
        calculates a first circular arc having a predetermined first radius from the first distance sensor and a second circular arc having a predetermined second radius from the second distance sensor, in response to determining that each of the first and second distance sensors has measured the corresponding one of the first distance and the second distance, the predetermined first radius of the first circular arc being equal to the first distance from the first distance sensor to the object, the predetermined second radius of the second circular arc being equal to the second distance from the second distance sensor to the object;
        determine whether there is a tangent line that is common to the first circular arc and the second circular arc;
        calculates (i) a first intersection point at which the tangent line intersects the first line of the azimuth region and (ii) a second intersection point at which the tangent line intersects the second line of the azimuth region, in response to determining that there is the tangent line that is common to the first circular arc and the second circular arc; and
        calculate a line segment between the first intersection point and the second intersection point,
    wherein
    the line segment comprises a width of the object.

2. The object detection device according to claim 1, wherein
    when only the first distance sensor has measured the first distance, the object determination section is configured to calculate:
        the first circular arc having the predetermined first radius from the first distance sensor;
        a first arc intersection point at which the first circular arc intersects the first line of the azimuth region; and
        a second arc intersection point at which the first circular arc intersects the second line of the azimuth region.

3. The object detection device according to claim 1, wherein when there is no tangent line that is common to the first circular arc and the second circular arc is configured to calculate:
    a pair of first azimuth intersection points, the first circular arc intersecting respectively the first line and the second line of the azimuth region at the pair of first azimuth intersection points; and
    a pair of second azimuth intersection points, the second circular arc intersecting respectively the first line and the second line of the azimuth region at the pair of second azimuth intersection points.

4. An object detection method comprising the steps of:
    acquiring, from an azimuth sensor provided to a vehicle, an azimuth region of an object that has a first end and a second end opposite to the first end, and is present around the vehicle, the azimuth region being defined between a first line and a second line, the first line extending from the vehicle toward the first end, the second line extending from the vehicle toward the second end;
    acquiring, from first and second distance sensors that are provided to the vehicle and are adjacent to each other, a first distance from the first distanced sensor to the object and a second distance from the second distance sensor to the object; and calculating:
   a first circular arc having a predetermined first radius from the first distance sensor, the predetermined first radius of the first circular arc being equal to the first distance from the first distance sensor to the object;
   a second circular arc having a predetermined second radius from the second distance sensor, the predetermined second radius of the second circular arc being equal to the second distance from the second distance sensor to the object;
   a tangent line that is common to the first circular arc and the second circular arc;
   a first intersection point at which the tangent line intersects the first line of the azimuth region;
   a second intersection point at which the tangent line intersects the second line of the azimuth region; and calculate a line segment between the first intersection point and the second intersection point, wherein the line segment comprises a width of the object.

5. A program product comprising a non-transitory computer-readable storage medium storing a program for detecting an object that is present around a vehicle, the program causing an ECU to perform the steps of:

acquiring, from an azimuth sensor provided to the vehicle, an azimuth region on an object that is present around the vehicle;

acquiring, from first and second distance sensors that are provided to the vehicle and are adjacent to each other, a first distance from the first distanced sensor to the object and a second distance from the second distance sensor to the object; and calculating:
   a first circular arc having a predetermined first radius from the first distance sensor, the predetermined first radius of the first circular arc being equal to the first distance from the first distance sensor to the object;
   a second circular arc having a predetermined second radius from the second distance sensor, the predetermined second radius of the second circular arc being equal to the second distance from the second distance sensor to the object;
   a tangent line that is common to the first circular arc and the second circular arc;
   a first intersection point at which the tangent line intersects a first line of the azimuth region;
   a second intersection point at which the tangent line intersects a second line of the azimuth region; and calculate a line segment between the first intersection point and the second intersection point, wherein the line segment comprises a width of the object.

\* \* \* \* \*